US009759033B2

(12) United States Patent
Meraz et al.

(10) Patent No.: US 9,759,033 B2
(45) Date of Patent: Sep. 12, 2017

(54) ELECTRONIC DEADMAN/AUTOSHEAR CIRCUIT

(71) Applicant: Shell Oil Company, Houston, TX (US)

(72) Inventors: Jose Meraz, Richmond, TX (US); Jason P. Curtiss, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 331 days.

(21) Appl. No.: 14/531,454

(22) Filed: Nov. 3, 2014

(65) Prior Publication Data

US 2015/0123022 A1 May 7, 2015

Related U.S. Application Data

(60) Provisional application No. 61/900,110, filed on Nov. 5, 2013.

(51) Int. Cl.

| | |
|---|---|
| ***F16D 31/02*** | (2006.01) |
| ***E21B 33/06*** | (2006.01) |
| ***F15B 13/043*** | (2006.01) |

(52) U.S. Cl.
CPC .......... *E21B 33/063* (2013.01); *F15B 13/043* (2013.01); *F15B 13/0433* (2013.01)

(58) Field of Classification Search
CPC ...... E21B 33/063; E21B 33/06; F16B 13/043; F16B 13/0431
See application file for complete search history.

(56) References Cited

U.S. PATENT DOCUMENTS 5,070,904 A * 12/1991 McMahon, Jr. .... E21B 33/0355 137/1
2011/0098946 A1* 4/2011 Curtiss, III ............ E21B 34/16 702/50
2012/0152555 A1* 6/2012 Judge ................. E21B 33/0355 166/336

* cited by examiner

*Primary Examiner* — Michael Leslie
*Assistant Examiner* — Daniel Collins

(57) ABSTRACT

A blowout preventer control system comprising: a blowout preventer comprising one or more casing shear rams and one or more blind shear rams; a casing shear ram close chamber; a blind shear ram close chamber; a first SPM valve; a second SPM valve; a first solenoid valve; a microprocessor; and a hydraulic fluid source.

18 Claims, 4 Drawing Sheets

ELECTRONIC DEADMAN/AUTOSHEAR CIRCUIT

CROSS-REFERENCE TO RELATED APPLICATIONS

This application claims the benefit of U.S. Provisional Application No. 61/900,110 filed Nov. 5, 2013, which is incorporated herein by reference

BACKGROUND

The present disclosure relates generally to electronic deadman/autoshear circuits. More specifically, in certain embodiments the present disclosure relates to deadman/autoshear circuits used in blowout preventers and associated methods.

Considerable safety measures are often required when drilling for oil and gas on-shore and off-shore. One such safety measure is the use of blowout preventers (BOPs). BOPs are basically large valves that close, isolate, and seal wellbores to prevent the discharge of pressurized oil and gas from the well during a kick or other event. One type of BOP used extensively is a ram-type BOP. This type of BOP uses opposing rams that close by moving together to either close around the pipe or to cut through the pipe and seal the wellbore.

The blowout preventers are typically operated using pressurized hydraulic fluid to control the position of the rams. Most BOPs are coupled to a fluid pump or another source of pressurized hydraulic fluid. In most applications, multiple BOPs are combined to form a BOP stack, and this may include the use of multiple types of BOPs. In some applications, a first ram of a BOP stack may be activated to shear the drill pipe and then subsequent rams may be operated to further seal the well bore once the drill pipe has been removed from the path of the subsequent rams.

In this case of multiple rams, it is often desirable to have a delay between the activation of the shearing ram and the activation of the sealing rams. Currently in the industry, this delay may be achieved by the use of a timing cylinder. Briefly, once the shearing ram is activated, hydraulic fluid may be allowed to fill into a piston cylinder pressurizing it until it reaches a pressure that is capable of actuating the secondary rams. Then the sealing rams are activated and the wellbore is effectively sealed. Other methods of sequencing the closure of multiple BOP shear rams rely on hydraulic timing circuits.

While such timing cylinders and circuits have been useful, they may suffer from several deficiencies. The timing cylinders and circuits may not always produce consistent or repeatable time intervals between the completion of the first shear ram function and the activation of the second shear ram function because they rely on hydraulic pressure and flow rates for timing. These inconsistent time intervals may results in the drill pipe still being in the path of the sealing rams when they are activated thus preventing the sealing of the well bore, late sealing of the wellbore or incomplete sealing of the wellbore.

It is desirable to develop a method and apparatus for sequentially activating blow out preventers that does not suffer the drawbacks of conventional methods.

SUMMARY

The present disclosure relates generally to electronic deadman/autoshear circuits. More specifically, in certain embodiments the present disclosure relates to deadman/autoshear circuits used in blowout preventers and associated methods.

In one embodiment, the present disclosure provides a blowout preventer control system comprising: a blowout preventer comprising one or more first rams and one or more second rams; a first ram close chamber, wherein the first ram close chamber is in fluid communication with the one or more first rams; a second ram close chamber, wherein the second ram close chamber is in fluid communication with the one or more second rams; a first valve, wherein the first valve is in fluid communication with the first ram close chamber; a second valve, wherein the second valve is in fluid communication with the second ram close chamber; a third valve, wherein the third valve is in fluid communication with the second valve; a microprocessor, wherein the microprocessor is in electrical communication with the third valve; and a hydraulic fluid source, wherein the hydraulic fluid source is in fluid communication with first valve and the second valve.

In another embodiment, the present disclosure provides a blowout preventer control system comprising: a blowout preventer comprising one or more first rams and one or more second rams; a first ram close chamber, wherein the first ram close chamber is in fluid communication with the one or more first rams; a second ram close chamber, wherein the second ram close chamber is in fluid communication with the one or more second rams; a first valve, wherein the first valve is in fluid communication with the first ram close chamber; a second valve, wherein the second valve is in fluid communication with the second ram close chamber; a third valve, wherein the third valve is in fluid communication with the first valve; a fourth valve, wherein the fourth valve is in fluid communication with the second valve; a fifth valve, wherein the fifth valve is in fluid communication with the third valve; a microprocessor, wherein the microprocessor is in electrical communication with the third valve and the fourth valve; and a hydraulic fluid source, wherein the hydraulic fluid source is in fluid communication with the first valve, the second valve, and the fifth valve.

In another embodiment, the present disclosure provides a method of actuating a blowout preventer comprising: providing a blowout preventer control system, wherein the blowout preventer comprises: a blowout preventer comprising one or more first rams and one or more second rams; a first ram close chamber, wherein the first ram close chamber is in fluid communication with the one or more first rams; a second ram close chamber, wherein the second ram close chamber is in fluid communication with the one or more second rams; a first valve, wherein the first valve is in fluid communication with the first ram close chamber; a second valve, wherein the second valve is in fluid communication with the second ram close chamber; a third valve, wherein the third valve is in fluid communication with the second valve; a microprocessor, wherein the microprocessor is in electrical communication with the third valve; and a hydraulic fluid source, wherein the hydraulic fluid source is in fluid communication with first valve and the second valve; providing a DMAS signal to the third valve; and allowing the blowout preventer control system to actuate the one or more first rams and the one or more second rams of the blowout preventer.

BRIEF DESCRIPTION OF THE DRAWINGS

A more complete and thorough understanding of the present embodiments and advantages thereof may be acquired by referring to the following description taken in conjunction with the accompanying drawings.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to electronic deadman/autoshear circuits. More specifically, in certain embodiments the present disclosure relates to deadman/autoshear circuits used in blowout preventers and associated methods.

One potential advantage of the electronic deadman/autoshear circuits discussed herein is that they may be capable of sequentially activating multiple rams in a BOP stack without relying on conventional timing devices such as piston cylinders. Another potential advantage of the electronic deadman/autoshear circuits discussed herein is that they may be capable of activating secondary rams in the event the primary ram does not activate.

In certain embodiments, the present disclosure describes a blow out preventer control system that utilizes a microprocessor and electric signals to activate and precisely time the sequence of a deadman/autoshear (DMAS) function, instead of conventional hydraulic signals. In certain embodiments, the blow out preventers discussed herein may utilize electric signals to initiate the operation of the DMAS sequence and the closing of casing shear rams. In certain embodiments, the timing of the closing of the blind shear rams may be precisely set by programming the microprocessor. In certain embodiments, the blow out preventer control systems discussed herein may be capable of sequencing the activation of any number of rams in a blow out preventer in any sequence.

Figure 1:
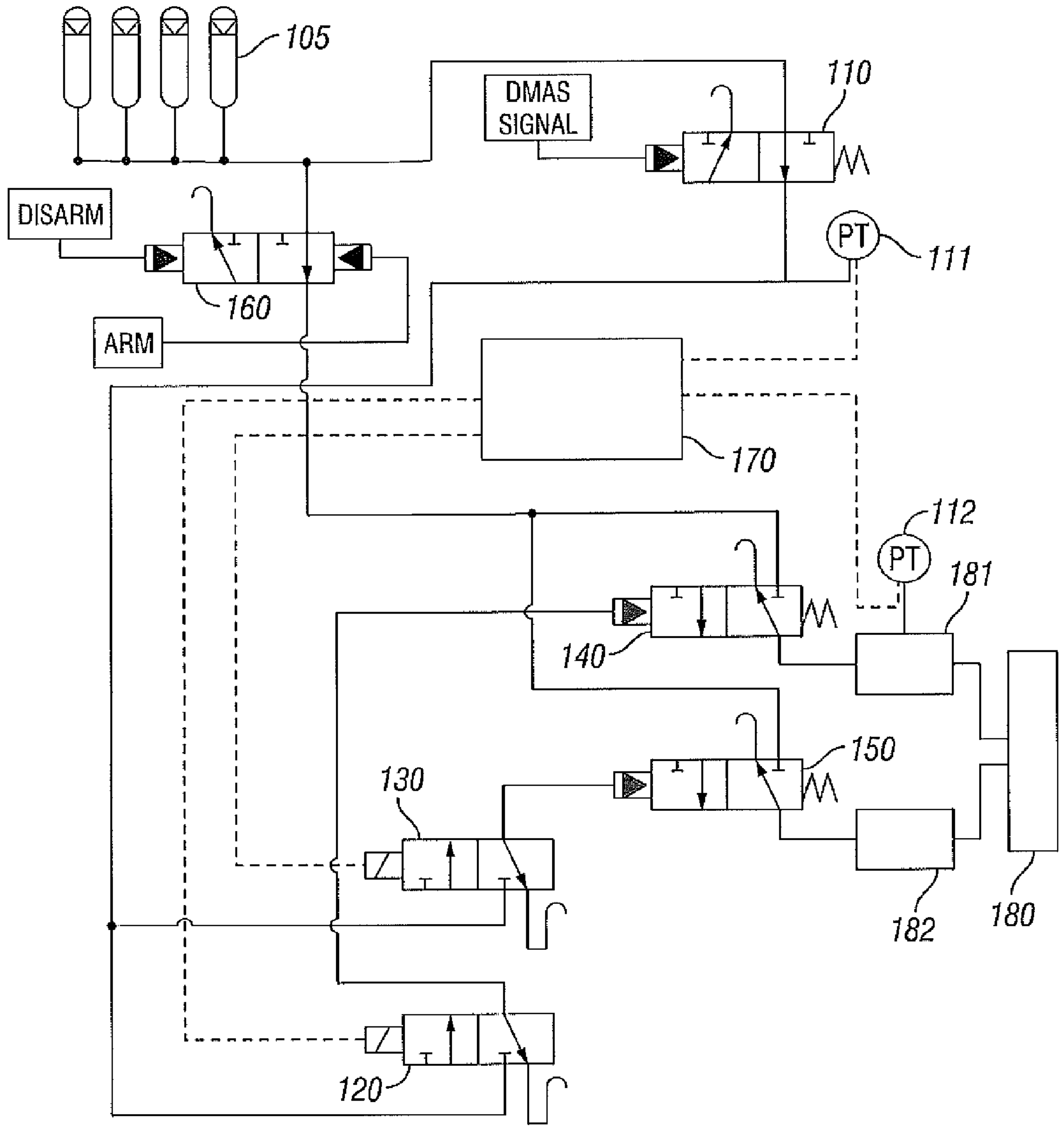
FIG. 1 is an illustration of a schematic for a blowout preventer control system in accordance with certain embodiments of the present disclosure.

Referring now to FIG. 1, FIG. 1 illustrates a schematic of a control system 100. In certain embodiments, control system 100 may comprise hydraulic fluid source 105, valve 110, valve 120, valve 130, valve 140, valve 150, microprocessor 170, BOP stack 180, ram close chamber 181, and ram close chamber 182.

In certain embodiments, valve 110 may be a ½" normally closed directional control valve. In certain embodiments, valve 110 may be a sub plate mounted (SPM) valve. In certain embodiments, valve 110 may be a 2-position 3-way valve. In other embodiments, valve 110 may be a flat slide-type directional control valve.

In certain embodiments, valve 110 may be capable of receiving a DMAS signal. In certain embodiments, the DMAS signal may be a loss of pressure signal. In certain embodiments, the DMAS signal may be a loss of pressure signal during normal drilling operations that originates from a surface control system that maintains valve 110 in the closed position. However, during a DMAS event there may be a separation or loss of hydraulic supply to the BOP and therefore the hydraulic pilot signal is lost at valve 110 allowing it to shift to its normally open position via a mechanical spring. In certain embodiments, resumption of the hydraulic pressure signal allows valve 110 to shift back to its closed position.

In certain embodiments, valve 110 may be fluidly coupled to a hydraulic fluid source 105, transducer 111, and valve 120. In certain embodiments, hydraulic fluid source 105 may comprise one or more accumulators. In certain embodiments, the one or more accumulators may comprise 3000 PSIG stack accumulators, 5000 PSIG stack accumulators, 7500 PSIG stack accumulators, or any combination thereof.

In certain embodiments, when valve 110 is in an open position, valve 110 may permit the flow of hydraulic fluid from hydraulic fluid source 105 to valve 120. In certain embodiments, the flow of hydraulic fluid from hydraulic fluid source 105 to valve 120 may permit transducer 111 to receive a hydraulic pilot signal. In certain embodiments, when valve 110 is in a closed position, valve 110 may permit the vent of any hydraulic pressure downstream of valve 110.

In certain embodiments, transducer 111 may be pressure transducer. In certain embodiments, transducer 111 may be a pressure switch. In certain embodiments, transducer 111 may be electrically coupled to microprocessor 170. In certain embodiments, transducer 111 may be capable of receiving a hydraulic pilot signal. In certain embodiments, the hydraulic pilot signal may be generated from the flow of hydraulic fluid from valve 110. In certain embodiments, transducer 111 may be capable of generating an activation signal upon receipt of the hydraulic pilot signal. In certain embodiments, transducer 111 may be capable of measuring the pressure directly downstream of valve 110. In certain embodiments, transducer 111 may be capable of generating an activation signal once the pressure downstream of valve 110 is measured to be in the range of 500 to 750 psig.

In certain embodiments, microprocessor 170 may be a silicon chip. In certain embodiments, microprocessor 170 may be capable of fetching, decoding, and executing data. In certain embodiments, microprocessor 170 may be capable of receiving an instruction signal and storing information from that signal. In certain embodiments, microprocessor 170 may be capable of decoding the information from that signal to determine which operations are to be executed. In certain embodiments, microprocessor 170 may be capable of executing those operations in a preprogrammed sequence.

In certain embodiments, microprocessor 170 may comprise one or more 24 VDC batteries. In certain embodiments, the 24 VDC batteries may be charged and monitored via a multiplex BOP control system. In certain embodiments, electrical power supplied through the BOP control system multiplex cable may be used to recharge the batteries of microprocessor 170. In certain embodiments, the condition/charge of the batteries could be monitored and this information could be transmitted back to surface via a multiplex control cable.

In certain embodiments, microprocessor 170 may be electrically coupled to transducer 111, valve 120, valve 130, and/or transducer 112. In certain embodiments, microprocessor 170 may be capable of receiving activation signals from transducer 111 and/or transducer 112. In certain embodiments, microprocessor 170 may be capable of generating activation signals to valve 120 and/or valve 130.

In certain embodiments, microprocessor 170 may be immediately able to generate an activation signal to valve 120 upon receipt of an activation signal from transducer 111. In certain embodiments, microprocessor 170 may be able to terminate the activation signal to valve 120 after a set time period. In certain embodiments, the set time period may be from 45 seconds to 60 seconds. In certain embodiments, microprocessor 170 may be immediately able to generate an activation signal to valve 130 upon receipt of an activation signal from transducer 112. In other embodiments, microprocessor 170 may be able to send an activation signal to valve 130 a set time period after the activation signal to the valve 120 is sent if no activation signal is received from transducer 112 within 60 to 90 seconds. In other embodiments, microprocessor 170 may be able to send an activation signal to valve 130 a set time period after the activation signal to the valve 120 is sent if no activation signal is received from transducer 112 within 60 to 90 seconds. In other embodiments, the microprocessor may be remotely controlled to send out activation signals.

In certain embodiments, valve 120 may be a ¼" normally closed solenoid valve. In other embodiments, valve 120 may be a 2-position 3-way valve. In other embodiments, valve 120 may be a solenoid valve that is opened and closed via an electric pilot signal.

In certain embodiments, valve 120 may be capable of receiving an activation signal from microprocessor 170. In certain embodiments, the activation signal may be a 24 VDC signal. In certain embodiments, valve 120 may be capable of transitioning from a normally closed position to an open position upon receipt of an activation signal.

In certain embodiments, valve 120 may be fluidly connected to valve 110 and/or valve 140. In certain embodiments, when valve 120 is in the open position, valve 120 may permit the flow of hydraulic fluid from valve 110 to valve 140. In certain embodiments, when valve 120 is in the closed position, valve 120 may permit the vent of any hydraulic pressure downstream of valve 120.

In certain embodiments, valve 140 may be a ½" normally closed directional control valve. In certain embodiments, valve 140 may be an SPM valve. In certain embodiments, valve 140 may be a 2-position 3-way valve. In other embodiments, valve 140 may be a flat slide-type directional control valve.

In certain embodiments, valve 140 may be capable of receiving hydraulic pressure from valve 120. In certain embodiments, valve 140 may be capable of transitioning from a normally closed position to an open position upon receipt/termination of hydraulic pressure.

In certain embodiments, valve 140 may be fluidly connected to hydraulic fluid source 105 and ram close chamber 181. In certain embodiments, when valve 140 is in the open position, valve 140 may permit the flow of hydraulic fluid from hydraulic fluid source 105 to ram close chamber 181. In certain embodiments, when valve 140 is in the closed position, valve 140 may permit the vent of any hydraulic pressure downstream of valve 140.

In certain embodiments, ram close chamber 181 may be a casing shear ram close chamber. In certain embodiments, ram close chamber 181 may be capable of closing one or more first rams of BOP stack 180. In certain embodiments, the one or more first rams of BOP stack 180 may be casing shear rams. In certain embodiments, ram close chamber 181 may comprise a hydraulic cylinder containing a piston with a rod that is connected to the one or more first rams of BOP stack 180. In certain embodiments, the piston may be capable of forcing the rod and the one or more first rams of BOP stack into a wellbore shearing any tubular that may be present. In certain embodiments, transducer 112 may be fluidly connected to ram close chamber 181.

In certain embodiments, transducer 112 may be a pressure transducer. In certain embodiments, transducer 112 may be a pressure switch. In certain embodiments, transducer 112 may be electrically coupled to microprocessor 170. In certain embodiments, transducer 112 may be capable of receiving a pilot hydraulic signal. In certain embodiments, the hydraulic pilot signal may be generated from the flow of hydraulic fluid from ram close chamber 181 to the one or more first rams of BOP stack 180. In certain embodiments, transducer 112 may be capable of generating an activation signal upon receipt of the hydraulic pilot signal. In certain embodiments, transducer 112 may be capable of measuring the pressure directly downstream of ram close chamber 181. In certain embodiments, transducer 112 may be capable of generating an activation signal once the pressure downstream of ram close chamber 181 is measured to be increasing or stabilizing.

In certain embodiments, valve 130 may be a ¼" normally closed solenoid valve. In other embodiments, valve 130 may be a 2-position 3-way valve. In other embodiments, valve 130 may be may be a solenoid valve that is opened and closed via an electric pilot signal.

In certain embodiments, valve 130 may be capable of receiving an activation signal from microprocessor 170. In certain embodiments, the activation signal may be a 24 VDC signal. In certain embodiments, valve 130 may be capable of transitioning from a normally closed position to an open position upon receipt of an activation signal.

In certain embodiments, valve 130 may be fluidly connected valve 110 and/or valve 150. In certain embodiments, when valve 130 is in the open position, valve 130 may permit the flow of hydraulic fluid from valve 110 to valve 150. In certain embodiments, when valve 130 is in the closed position, valve 130 may permit the vent of any hydraulic pressure downstream of valve 130.

In certain embodiments, valve 150 may be a 1" normally closed directional control valve. In certain embodiments, valve 150 may be an SPM valve. In certain embodiments, valve 150 may be a 2-position 3-way valve. In other embodiments, valve 150 may be a flat slide-type directional control valve.

In certain embodiments, valve 150 may be capable of receiving hydraulic pressure from valve 130. In certain embodiments, valve 150 may be capable of transitioning from a normally closed position to an open position upon receipt/termination of hydraulic pressure.

In certain embodiments, valve 150 may be fluidly connected to hydraulic fluid source 105 and ram close chamber 182. In certain embodiments, when valve 150 is in the open position, valve 150 may permit the flow of hydraulic fluid from hydraulic fluid source 105 to ram close chamber 182. In certain embodiments, when valve 150 is in the closed position, valve 150 may permit the vent of any hydraulic pressure downstream of valve 150.

In certain embodiments, ram close chamber 182 may be a blind shear ram close chamber. In certain embodiments, ram close chamber 182 may be capable of closing one or more second rams of BOP stack 180. In certain embodiments, the one or more second rams of BOP stack 180 may be blind shear rams. In certain embodiments, ram close chamber 182 may comprise a hydraulic cylinder containing a piston with a rod that is connected to the one or more second rams of BOP stack 180. In certain embodiments, the piston may be capable of forcing the rod and the one or more second rams of BOP stack into a wellbore effectively sealing that wellbore.

In certain embodiments, schematic control system 100 may further comprise a valve 160. In certain embodiments, valve 160 may be an ARM/DISARM valve. In certain embodiments, valve 160 may be 1" SPM valve. In other embodiments, valve 160 may be a 2-position 3-way valve.

In certain embodiments, valve 160 may be capable of receiving an ARM/DISARM hydraulic pressure signal. In certain embodiments, valve 160 may be capable of transitioning from an open or armed position to a closed or disarmed position upon receipt/termination of the DISARM signal. Similarly, upon receipt of an ARM signal, valve 160 may be capable of transition from a closed or disarmed position to an open or armed position. In other embodiments, valve 160 may be activated mechanically with an ROV.

In certain embodiments, valve 160 may be fluidly connected to hydraulic fluid source 105, valve 140, and valve 150. In certain embodiments, when valve 160 is in the open position, valve 160 may permit the flow of hydraulic fluid from hydraulic fluid source 105 to valve 140 and valve 150. In certain embodiments, when valve 160 is in the closed position, valve 160 may permit venting of any hydraulic pressure downstream of valve 160.

Figure 2:
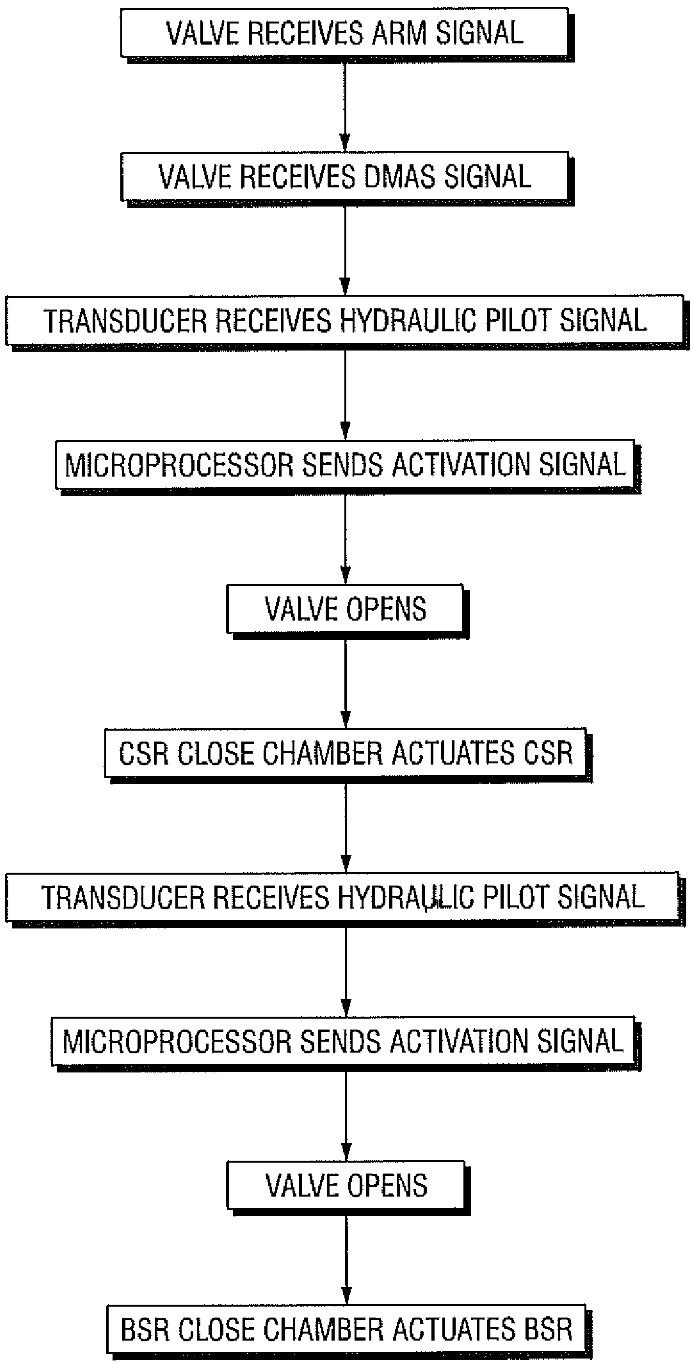
FIG. 2 is a process flow chart for the operation of the blowout preventer control system of FIG. 1.

Referring now to FIG. 2, FIG. 2 is a process flow diagram illustrating how the control system 100 may function to actuate a blowout preventer stack.

In a first step, valve 160 may receive an ARM signal and be moved to an open position. Once valve 160 is in the open position, hydraulic fluid may flow from hydraulic fluid source 105 to valve 140 and valve 150.

In a second step, valve 110 may receive a DMAS signal and be moved to an open position. Once valve 110 is in the open position, hydraulic fluid may flow from hydraulic fluid source 105 to valve 120.

In a third step, transducer 111 may receive a hydraulic pilot signal and send an activation signal to microprocessor 170.

In a fourth step, microprocessor 170 may send an activation signal to valve 120 causing valve 120 to shift to the open position. Once valve 120 is in the open position, hydraulic fluid may flow from valve 120 to valve 140.

In a fifth step, once sufficient hydraulic pressure has reached valve 140, valve 140 may shift to the open position. Once valve 140 is in the open position, fluid from hydraulic fluid source 105 may then flow into ram close chamber 181.

In a sixth step, once sufficient hydraulic pressure has reached ram close chamber 181, the ram close chamber 181 may actuate the closing of the first rams of blowout preventer stack 180.

In a sixth step, once the first rams are closed, transducer 112 may receive a hydraulic pilot signal and send an activation signal to microprocessor 170.

In a seventh step, microprocessor 170 may send an activation signal to valve 130 causing valve 130 to shift to the open position. Once valve 130 is in the open position, hydraulic fluid may flow from valve 130 to valve 150.

In an eighth step, once sufficient hydraulic pressure has reached valve 150, valve 150 may shift to the open position. Once valve 150 is in the open position, fluid from hydraulic fluid source 105 may then flow to ram close chamber 182.

In a ninth step, once sufficient hydraulic pressure has reached ram close chamber 182, the ram close chamber 182 may actuate the closing of the second rams of blowout preventer stack 180.

Figure 3:
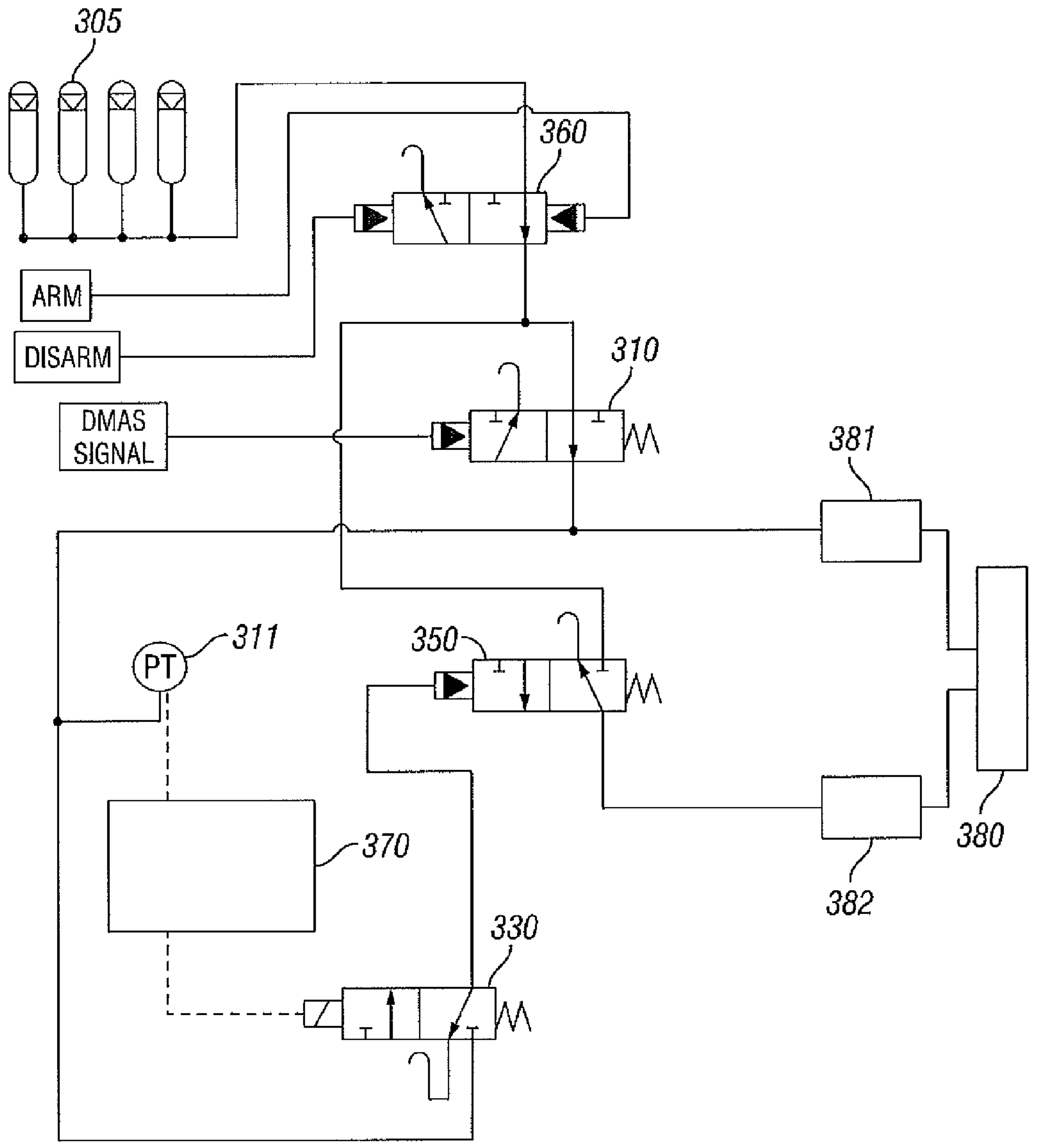
FIG. 3 is an illustration of a schematic for a blowout preventer control system in accordance with certain embodiments of the present disclosure.

Referring now to FIG. 3, FIG. 3 illustrates a schematic of a control system 300. In certain embodiments, control system 300 may comprise hydraulic fluid source 305, valve 310, valve 330, valve 350, valve 360, microprocessor 370, BOP stack 380, Close chamber 381, and BSR close chamber 382.

In certain embodiments, valve 310 may be a ½" normally closed directional control valve. In certain embodiments, valve 310 may be an SPM valve. In certain embodiments, valve 310 may be a 2-position 3-way valve. In other embodiments, valve 310 may be a flat slide-type directional control valve.

In certain embodiments, valve 310 may be capable of receiving a DMAS signal. In certain embodiments, the DMAS signal may be a loss of pressure signal. In certain embodiments, the DMAS signal may be a loss of pressure signal during normal drilling operations that originates from a surface control system that maintains valve 310 in the closed position. However, during a DMAS event there may be a separation or loss of hydraulic supply to the BOP and therefore the hydraulic pilot signal is lost at valve 310 allowing it to shift to its normally open position via a mechanical spring.

In certain embodiments, valve 310 may be fluidly coupled to a hydraulic fluid source 305, transducer 311, valve 330, and ram close chamber 381. In certain embodiments, hydraulic fluid source 305 may comprise one or more accumulators. In certain embodiments, the one or more accumulators may comprise 3000 PSIG stack accumulators, 5000 PSIG stack accumulators, 7500 PSIG stack accumulators, or any combination thereof.

In certain embodiments, when valve 310 is in the open position, valve 310 may permit the flow of hydraulic fluid from hydraulic fluid source 305 to valve 330 and ram close chamber 381. In certain embodiments, the flow of hydraulic fluid from hydraulic fluid source 305 to valve 330 may permit transducer 311 to receive a hydraulic pilot signal. In certain embodiments, when valve 310 is in the closed position, valve 310 may permit the vent of any hydraulic pressure downstream of valve 310.

In certain embodiments, ram close chamber 381 may be capable of closing one or more first rams of BOP stack 380. In certain embodiments, the one or more first rams of BOP stack 380 may be casing shear rams. In certain embodiments, ram close chamber 381 may comprise a hydraulic cylinder containing a piston with a rod that is connected to the one or more first rams of BOP stack 380. In certain embodiments, the piston may be capable of forcing the rod and the one or more first rams of BOP stack into a wellbore shearing any tubular that may be present.

In certain embodiments, transducer 311 may be a pressure transducer. In certain embodiments, transducer 311 may be a pressure switch. In certain embodiments, transducer 311 may be electrically coupled to microprocessor 370. In certain embodiments, transducer 311 may be capable of receiving a hydraulic pilot signal. In certain embodiments, the hydraulic pilot signal may be generated from the flow of hydraulic fluid from valve 310. In certain embodiments, first transducer 311 may be capable of generating an activation signal upon receipt of the hydraulic pilot signal. In certain embodiments, transducer 311 may be capable of measuring the pressure directly downstream of valve 310. In certain embodiments, transducer 311 may be capable of generating an activation signal once the pressure downstream of valve 310 is measured to be to be increasing or stabilizing.

In certain embodiments, microprocessor 370 may be a silicon chip. In certain embodiments, microprocessor 370 may be capable of fetching, decoding, and executing data. In certain embodiments, microprocessor 370 may be capable of receiving an instruction signal and storing information from that signal. In certain embodiments, microprocessor 370 may be capable of decoding the information from that signal to determine which operations are to be executed. In certain embodiments, microprocessor 370 may be capable of executing those operations in a preprogrammed sequence.

In certain embodiments, microprocessor 370 may comprise one or more 24 VDC batteries. In certain embodiments, the 24 VDC batteries may be charged and monitored via a multiplex BOP control system. In certain embodiments, electrical power supplied through the BOP control system multiplex cable may be used to recharge the batteries of microprocessor 370. In certain embodiments, the condition/charge of the batteries could be monitored and this information could be transmitted back to surface via a multiplex control cable.

In certain embodiments, microprocessor 370 may be electrically coupled to transducer 311 and valve 330. In certain embodiments, microprocessor 370 may be capable of receiving activation signals from transducer 311. In certain embodiments, microprocessor 370 may be capable of generating activation signals to valve 330.

In certain embodiments, microprocessor 370 may be immediately able to generate an activation signal to valve 330 upon receipt of an activation signal from transducer 311. In certain embodiments, microprocessor 370 may be able to terminate the activation signal to valve 330 after a set time period, permitting any hydraulic pressure downstream of valve 330 to vent. In certain embodiments, the set time period may be from 45 seconds to 60 seconds. In other embodiments, microprocessor 370 may be remotely controlled to send out activation signals.

In certain embodiments, valve 330 may be a ¼" normally closed solenoid valve. In certain embodiments, valve 330 may be may be a 2-position 3-way valve.

In certain embodiments, valve 330 may be capable of receiving an activation signal from microprocessor 370. In certain embodiments, the activation signal may be a 24 VDC signal. In certain embodiments, valve 330 may be capable of transitioning from a normally closed position to an open position upon receipt of an activation signal.

In certain embodiments, valve 330 may be fluidly connected valve 310 valve 350. In certain embodiments, when valve 330 is in the open position, valve 330 may permit the flow of hydraulic fluid from valve 310 to valve 350. In certain embodiments, when valve 330 is in the closed position, valve 330 may permit venting of any hydraulic pressure downstream of valve 330.

In certain embodiments, valve 350 may be a 1" normally closed directional control valve. In certain embodiments, valve 350 may be an SPM valve. In certain embodiments, valve 350 may be a 2-position 3-way valve. In other embodiments, valve 350 may be a flat slide-type directional control valve.

In certain embodiments, valve 350 may be capable of receiving hydraulic fluid from valve 330. In certain embodiments, valve 350 may be capable of transitioning from a normally closed position to an open position upon receipt/termination of hydraulic pressure.

In certain embodiments, valve 350 may be fluidly connected to hydraulic fluid source 305 and ram close chamber 382. In certain embodiments, when valve 350 is in the open position, valve 350 may permit the flow of hydraulic fluid from hydraulic fluid source 305 to ram close chamber 382. In certain embodiments, when valve 350 is in the closed position, valve 350 may permit venting of any hydraulic pressure downstream of valve 350.

In certain embodiments, ram close chamber 382 may be capable of closing one or more second rams of BOP stack 380. In certain embodiments, the one or more second rams of BOP stack 380 may be casing shear rams. In certain embodiments, ram close chamber 382 may comprise a hydraulic cylinder containing a piston with a rod that is connected to the one or more second rams of BOP stack 380. In certain embodiments, the piston may be capable of forcing the rod and the one or more second rams of BOP stack 380 into a wellbore effectively sealing that wellbore.

In certain embodiments, schematic control system 300 may further comprise a valve 360. In certain embodiments, valve 360 may be an ARM/DISARM valve. In certain embodiments, valve 360 may be 1" SPM valve. In other embodiments, valve 360 may be a 2-position 3-way valve. In other embodiments, valve 360 may be a flat slide-type directional control valve.

In certain embodiments, valve 360 may be capable of receiving an ARM/DISARM hydraulic pressure signal. In certain embodiments, valve 360 may be capable of transitioning from an open or armed position to a closed or disarmed position upon receipt/termination of the DISARM signal. Similarly, upon receipt of an ARM signal, valve 360 may be capable of transition from a closed or disarmed position to an open or armed position. In other embodiments, valve 360 may be activated mechanically with an ROV.

In certain embodiments, valve 360 may be fluidly connected to hydraulic fluid source 305, valve 310, and valve 350. In certain embodiments, when valve 360 is in the open position, valve 360 may permit the flow of hydraulic fluid from hydraulic fluid source 305 to valve 310 and valve 350. In certain embodiments, when valve 360 is in the closed position, valve 360 may permit venting of any hydraulic pressure downstream of valve 360.

Figure 4:
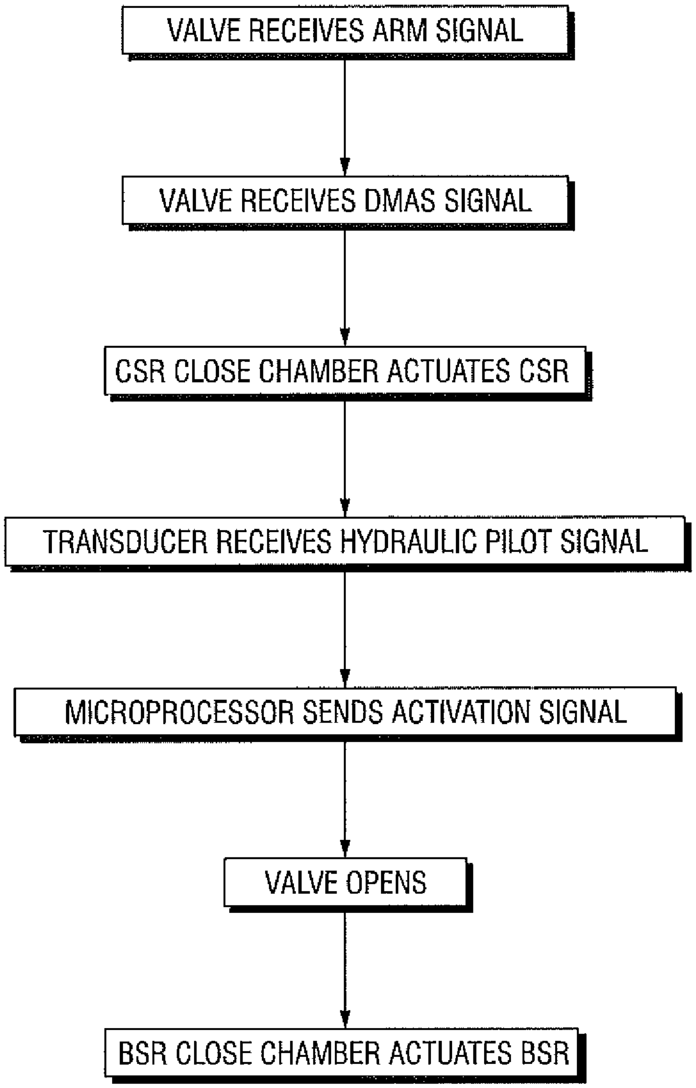
FIG. 4 is a process flow chart for the operation of the blowout preventer control system of FIG. 3.

Referring now to FIG. 4, FIG. 4 is a process flow diagram illustrating how the control system 300 may function to actuate a blowout preventer stack.

In a first step, valve 360 may receive an ARM signal and be moved to an open position. Once valve 360 is in the open position, hydraulic fluid may flow from hydraulic fluid source 305 to valve 310 and valve 350.

In a second step, valve 310 may receive a DMAS signal and be moved to an open position. Once valve 310 is in the open position, hydraulic fluid may flow from hydraulic fluid source 305 to valve 330 and ram close chamber 381.

In a third step, once sufficient hydraulic pressure has reached ram close chamber 381, ram close chamber 381 may actuate the closing of the one or more first rams of blowout preventer stack 380.

In a fourth step, once the one or more first rams are closed, transducer 311 may receive a hydraulic pilot signal and send an activation signal to microprocessor 370.

In a fifth step, microprocessor 370 may send an activation signal to valve 330 causing valve 330 to shift to the open position. Once valve 330 is in the open position, hydraulic fluid may flow from valve 330 to valve 350.

In a sixth step, once sufficient hydraulic pressure has reached valve 350, valve 350 may shift to the open position. Once valve 350 is in the open position, fluid from hydraulic fluid source 305 may then flow into ram close chamber 382.

In a seventh step, once sufficient hydraulic pressure has reached ram close chamber 382, ram close chamber 382 may actuate the closing of the one or more second rams of blowout preventer stack 380.

In another embodiment, the present disclosure provides a method of actuating a blowout preventer comprising: providing a blowout preventer control system, wherein the blowout preventer comprises: a blowout preventer comprising one or more first rams and one or more second rams; a first ram close chamber, wherein the first ram close chamber is in fluid communication with the one or more first rams; a second ram close chamber, wherein the second ram close chamber is in fluid communication with the one or more second rams; a first valve, wherein the first valve is in fluid communication with the first ram close chamber; a second valve, wherein the second valve is in fluid communication with the second ram close chamber; a third valve, wherein the third valve is in fluid communication with the second valve; a microprocessor, wherein the microprocessor is in electrical communication with the third valve; and a hydraulic fluid source, wherein the hydraulic fluid source is in fluid communication with first valve and the second valve; providing a DMAS signal to the third valve; and allowing the blowout preventer control system to actuate the one or more first rams and the one or more second rams of the blowout preventer.

In certain embodiments, the blowout preventer system may comprise any of the features discussed above with respect to control system 100 and/or control system 300.

In certain embodiments, allowing the blowout preventer control system to actuate the one or more casing shear rams and the one or more blind shear rams may comprise any combination of steps discussed above.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A blowout preventer control system comprising:
- a blowout preventer comprising one or more first rams and one or more second rams;
- a first ram close chamber, wherein the first ram close chamber is in fluid communication with the one or more first rams;
- a second ram close chamber, wherein the second ram close chamber is in fluid communication with the one or more second rams;
- a first valve, wherein the first valve is in fluid communication with the first ram close chamber;
- a second valve, wherein the second valve is in fluid communication with the second ram close chamber;
- a third valve, wherein the third valve is in fluid communication with the second valve;
- a microprocessor, wherein the microprocessor is in electrical communication with the third valve;
- a hydraulic fluid source, wherein the hydraulic fluid source is in fluid communication with first valve and the second valve; and

- a fourth valve, wherein the fourth valve is in fluid communication with the hydraulic fluid source, the first valve, and the second valve.

2. The blowout preventer control system of claim 1, wherein the one or more first rams comprise casing shear rams.

3. The blowout preventer control system of claim 1, wherein the one or more second rams comprise blind shear rams.

4. The blowout preventer control system of claim 1, wherein the first valve is an SPM valve capable of receiving a DMAS signal.

5. The blowout preventer control system of claim 1, wherein the first valve is in fluid communication with a first transducer.

6. The blowout preventer control system of claim 5, wherein the first transducer is in electrical communication with the microprocessor.

7. The blowout preventer control system of claim 1, wherein the third valve is a solenoid valve capable of receiving an activation signal from the microprocessor.

8. A blowout preventer control system comprising:
- a blowout preventer comprising one or more first rams and one or more second rams;
- a first ram close chamber, wherein the first ram close chamber is in fluid communication with the one or more first rams;
- a second ram close chamber, wherein the second ram close chamber is in fluid communication with the one or more second rams;
- a first valve, wherein the first valve is in fluid communication with the first ram close chamber;
- a second valve, wherein the second valve is in fluid communication with the second ram close chamber;
- a third valve, wherein the third valve is in fluid communication with the first valve;
- a fourth valve, wherein the fourth valve is in fluid communication with the second valve;
- a fifth valve, wherein the fifth valve is in fluid communication with the third valve and wherein the fifth valve is an SPM valve capable of receiving a DMAS signal;
- a microprocessor, wherein the microprocessor is in electrical communication with the third valve and the fourth valve; and
- a hydraulic fluid source, wherein the hydraulic fluid source is in fluid communication with the first valve, the second valve, and the fifth valve.

9. The blowout preventer control system of claim 8, wherein the one or more first rams comprise casing shear rams.

10. The blowout preventer control system of claim 8, wherein the one or more second rams comprise blind shear rams.

11. The blowout preventer control system of claim 8, wherein the fifth valve is in fluid communication with a first transducer.

12. The blowout preventer control system of claim 11, wherein the first transducer is in electrical communication with the microprocessor.

13. The blowout preventer control system of claim 8, wherein the first ram close chamber is in fluid communication with a second transducer.

14. The blowout preventer control system of claim 13, wherein the second transducer is in electrical communication with the microprocessor.

15. The blowout preventer control system of claim 8, wherein the third valve is a solenoid valve capable of receiving an activation signal from the microprocessor.

16. The blowout preventer control system of claim 8, wherein the fourth valve is a solenoid valve capable of receiving an activation signal from the microprocessor.

17. The blowout preventer control system of claim 8, further comprising a sixth valve in fluid communication with the hydraulic fluid source, the first valve, the second valve, and the third fifth valve.

18. A method of actuating a blowout preventer comprising:

providing a blowout preventer control system, wherein the blowout preventer comprises:

a blowout preventer comprising one or more first rams and one or more second rams;

a first ram close chamber, wherein the first ram close chamber is in fluid communication with the one or more first rams;

a second ram close chamber, wherein the second ram close chamber is in fluid communication with the one or more second rams;

a first valve, wherein the first valve is in fluid communication with the first ram close chamber;

a second valve, wherein the second valve is in fluid communication with the second ram close chamber;

a third valve, wherein the third valve is in fluid communication with the second valve;

a microprocessor, wherein the microprocessor is in electrical communication with the third valve; and a hydraulic fluid source, wherein the hydraulic fluid source is in fluid communication with first valve and the second valve;

providing a DMAS signal to the third valve; and allowing the blowout preventer control system to actuate the one or more first rams and the one or more second rams of the blowout preventer.

* * * * *